United States Patent
Rhoden

(10) Patent No.: US 9,341,119 B2
(45) Date of Patent: May 17, 2016

(54) COOLING AIR SYSTEM FOR AIRCRAFT TURBINE ENGINE

(71) Applicant: Hamilton Sundstrand Corporation, Charlotte, NC (US)

(72) Inventor: William E. Rhoden, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 116 days.

(21) Appl. No.: 14/323,251

(22) Filed: Jul. 3, 2014

(65) Prior Publication Data

US 2016/0003153 A1 Jan. 7, 2016

(51) Int. Cl.
*F02C 7/18* (2006.01)
*F02C 6/08* (2006.01)
*F02K 3/04* (2006.01)

(52) U.S. Cl.
CPC . *F02C 7/185* (2013.01); *F02C 6/08* (2013.01); *F02K 3/04* (2013.01)

(58) Field of Classification Search
CPC .............. F02C 7/14; F02C 6/08; F02C 7/224; F02C 7/185; F02C 7/16; F02C 7/18; F01D 25/12; F02K 3/115; F02K 3/04
See application file for complete search history.

(56) References Cited

U.S. PATENT DOCUMENTS

| | | | | |
|---|---|---|---|---|
| 5,392,614 A * | 2/1995 | Coffinberry | ............... | F02C 7/12 60/806 |
| 5,452,573 A * | 9/1995 | Glickstein | ................. | F02C 6/08 60/39.183 |
| 5,581,996 A * | 12/1996 | Koch | ....................... | F01D 5/141 60/266 |
| 6,050,079 A * | 4/2000 | Durgin | .................... | F02C 7/125 415/115 |
| 6,612,114 B1 * | 9/2003 | Klingels | ................. | F01D 5/187 415/115 |
| 6,901,739 B2 | 6/2005 | Christopherson | | |
| 7,861,512 B2 * | 1/2011 | Olver | ........................ | F02C 7/14 60/226.1 |
| 8,056,345 B2 * | 11/2011 | Norris | ....................... | F02C 7/14 60/736 |
| 8,561,384 B2 | 10/2013 | McCall | | |
| 8,596,072 B2 | 12/2013 | Wehmeier | | |

(Continued)

FOREIGN PATENT DOCUMENTS

| | | |
|---|---|---|
| WO | 2011139317 A2 | 11/2011 |
| WO | 2014051678 A1 | 4/2014 |
| WO | 2014158244 A2 | 10/2014 |

OTHER PUBLICATIONS

Great Britain Search Report for application No. GB1511613.0; Mailing Date Dec. 23, 2015, 5 pages.

*Primary Examiner* — Phutthiwat Wongwian
*Assistant Examiner* — Stefan Ibroni
(74) *Attorney, Agent, or Firm* — Cantor Colburn LLP

(57) ABSTRACT

In one aspect, a turbine engine is provided. The engine includes a fan, a core engine case configured to receive a core airflow, and an inner fan case. An inner air bypass is defined between the core engine case and the inner fan case, and the engine further includes an outer fan case, an outer air bypass defined between the inner fan case and the outer fan case, a first heat exchanger arranged in the core engine case, the first heat exchanger providing heat exchange between the liquid and the core airflow to cool the core airflow, and a second heat exchanger arranged in the outer air bypass. The second heat exchanger is fluidly coupled to the first heat exchanger to receive the cooled core airflow. The second heat exchanger provides heat exchange between cooled core airflow and the second portion of airflow to further cool the cooled core airflow.

15 Claims, 3 Drawing Sheets

(56) References Cited

U.S. PATENT DOCUMENTS

| | | | | |
|---|---|---|---|---|
| 8,756,910 B2* | 6/2014 | Donovan | ................ | F01D 25/12 415/115 |
| 8,904,753 B2* | 12/2014 | Murphy | ................ | F01D 17/085 165/96 |
| 8,910,465 B2* | 12/2014 | Snyder | ................ | F01D 25/12 60/266 |
| 2011/0162387 A1* | 7/2011 | Chir | ................ | F01D 5/081 60/806 |
| 2013/0192254 A1 | 8/2013 | Campbell et al. | | |
| 2013/0318981 A1 | 12/2013 | Kupratis | | |
| 2013/0343866 A1 | 12/2013 | Christians | | |
| 2014/0182264 A1* | 7/2014 | Weisgerber | ................ | F01D 11/24 60/39.19 |
| 2014/0271116 A1* | 9/2014 | Snyder | ................ | F01D 25/12 415/1 |

* cited by examiner

COOLING AIR SYSTEM FOR AIRCRAFT TURBINE ENGINE

BACKGROUND OF THE INVENTION

The following disclosure generally relates to aircraft turbine engines, and more particularly, to cooling portions of aircraft turbine engines.

Known turbofan gas turbine aircraft engines typically include a serial arrangement of a fan, a compressor, a combustor, and a turbine. The compressor, combustor, and turbine typically comprise a core engine. Air admitted into the inlet of the engine is compressed by the compressor, and the compressed air is then mixed with fuel in the combustor and burned. The high-energy products of combustion of the burned air/fuel mixture then enter and drive the turbine, which drives the compressor and fan. The combustion products then exit the engine at the core engine exhaust nozzle, producing thrust to power an associated aircraft.

A number of components associated with gas turbine engines require some degree of cooling during operation. For example, electronics systems and fluid supply systems may generate high amounts of thermal energy, which may reduce system efficiency and cause system damage. Accordingly, it is desirable to provide cooling to components of the gas turbine engines.

BRIEF DESCRIPTION OF THE INVENTION

In one aspect, a turbine engine is provided. The engine includes a fan, a core engine case configured to receive a core airflow, and an inner fan case. An inner air bypass is defined between the core engine case and the inner fan case, and the inner air bypass is configured to receive a first portion of an airflow from the fan. The engine further includes an outer fan case, an outer air bypass defined between the inner fan case and the outer fan case, the outer air bypass configured to receive a second portion of the airflow from the fan, a first heat exchanger arranged in the core engine case and configured to receive a liquid and the core airflow, the first heat exchanger providing heat exchange between the liquid and the core airflow to cool the core airflow, and a second heat exchanger arranged in the outer air bypass. The second heat exchanger is fluidly coupled to the first heat exchanger to receive the cooled core airflow, and the second heat exchanger provides heat exchange between the cooled core airflow and the second portion of the airflow to further cool the cooled core airflow.

In another aspect, a method of assembling a turbine engine is provided. The method includes providing a fan, providing a core engine case configured to receive a core airflow, and providing an inner fan case about the core engine case. An inner air bypass is defined between the core engine case and the inner fan case, and the inner air bypass is configured to receive a first portion of an airflow from the fan. The method further includes providing an outer fan case about the inner fan case, where an outer air bypass is defined between the inner fan case and the outer fan case, the outer air bypass configured to receive a second portion of the airflow from the fan, and arranging a first heat exchanger in the core engine case. The first heat exchanger is configured to receive a liquid and the core airflow, the first heat exchanger providing heat exchange between the liquid and the core airflow to cool the core airflow. The method further includes arranging a second heat exchanger in the outer air bypass and fluidly coupling the second heat exchanger to the first heat exchanger to receive the cooled core airflow. The second heat exchanger provides heat exchange between the cooled core airflow and the second portion of the airflow to further cool the cooled core airflow.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
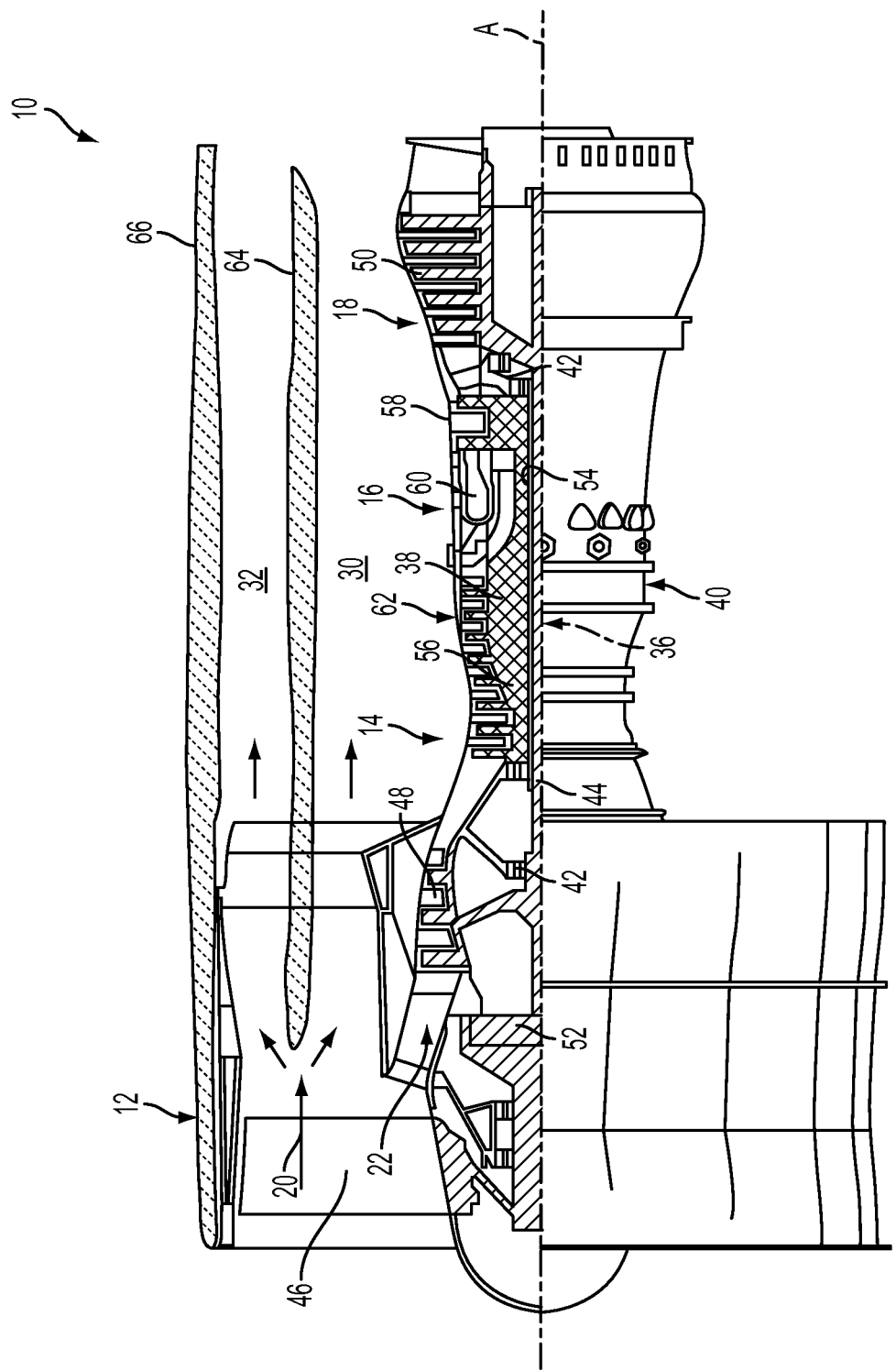
FIG. 1 is a partial cross-sectional view of a gas turbine engine.

FIG. 1 illustrates a gas turbine engine 10 that generally includes a fan section 12, a compressor section 14, a combustor section 16, and a turbine section 18. Engine 10 may include an augmentor section (not shown) among other systems or features. Fan section 12 drives fan airflow 20 along a first or inner air bypass 30 and a second or outer air bypass 32. Compressor section 14 drives a core airflow 22 along a core flowpath 34 for compression and subsequent delivery into combustor section 16 where the air is expanded through turbine section 18. Although depicted as a turbofan gas turbine engine, it should be understood that the concepts described herein may be applied to other types of turbine engines.

Engine 10 includes a low-speed spool 36 and a high-speed spool 38 mounted for rotation about an engine central longitudinal axis 'A' relative to an engine static structure 40 via bearing systems 42.

Figure 2:
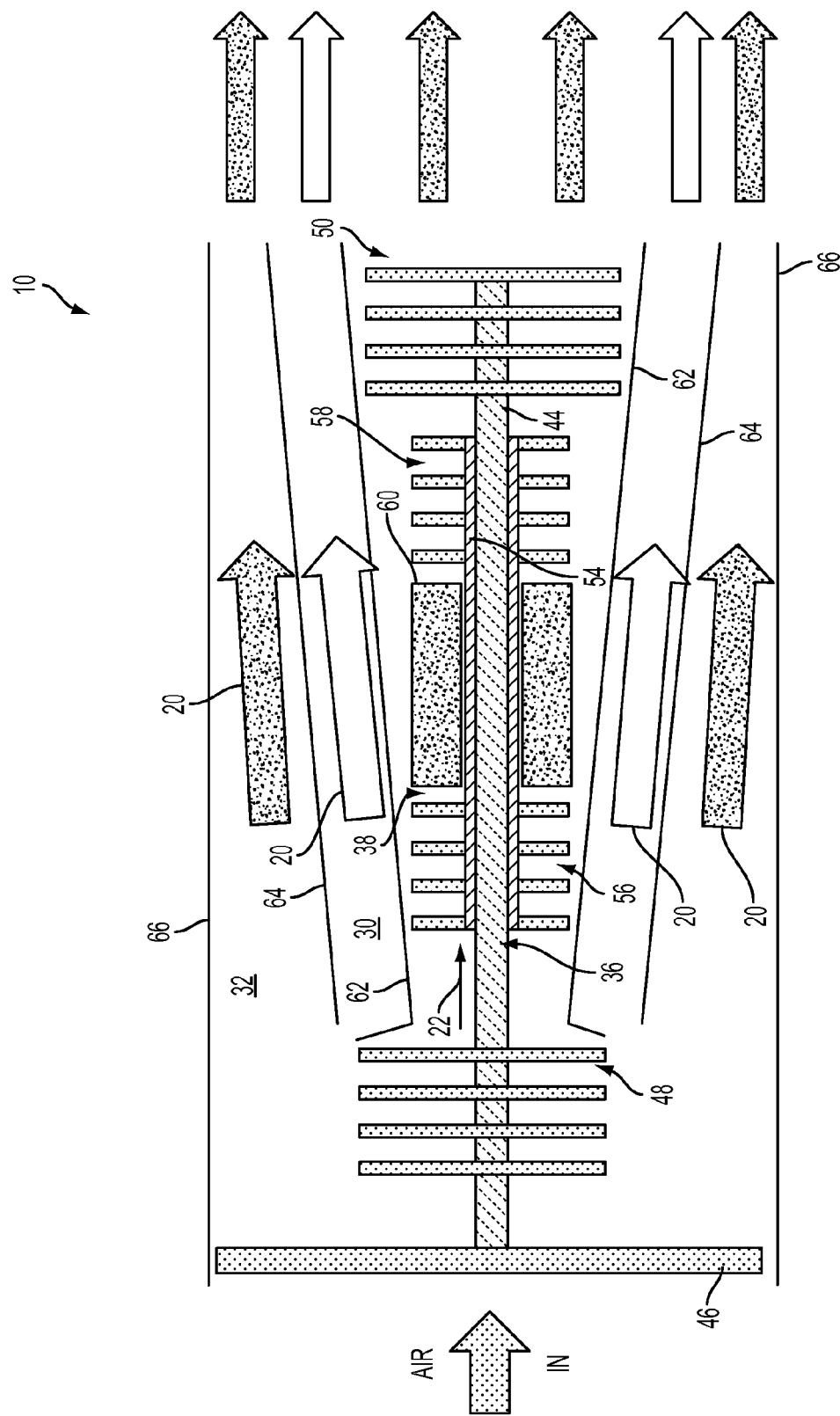
FIG. 2 is a schematic view of a portion of the gas turbine engine shown in FIG. 1.

With additional reference to FIG. 2, low-speed spool 36 includes an inner shaft 44 interconnecting a fan 46, a low pressure compressor 48, and a low pressure turbine 50 Inner shaft 44 is connected to fan 46 through a geared architecture 52 to drive fan 46 at a lower speed than low speed spool 36. High-speed spool 38 includes an outer shaft 54 that interconnects a high pressure compressor 56 and a high pressure turbine 58, and a combustor 60 is arranged between high pressure compressor 56 and high pressure turbine 58. Inner shaft 44 and outer shaft 54 are concentric and rotate via bearing systems 42 about the longitudinal axis 'A', which is co-linear with the longitudinal axis of shafts 44, 54.

Core airflow 22 is compressed by low pressure compressor 48 followed by high pressure compressor 56, mixed and burned with fuel in combustor 60, and expanded through high pressure turbine 58 and low pressure turbine 50. Turbines 50, 58 rotationally drive respective low-speed spool 36 and high-speed spool 38 in response to the expansion. Fan airflow 20 through inner bypass 30 provides thrust to engine 10, and fan airflow 20 through both bypasses 30, 32 provides cooling to components of engine 10 or portions of an associated vehicle, as is described herein in more detail.

As shown in FIG. 2, fan airflow 20 flows through inner bypass 30 and outer bypass 32 Inner bypass 30 is defined between a core engine case 62 and an inner fan case 64, and outer bypass 32 is defined between inner fan case 64 and an outer fan case 66. As such, inner bypass 30 is arranged concentrically about engine core case 62, and outer bypass 32 is arranged concentrically about inner bypass 30.

Figure 3:
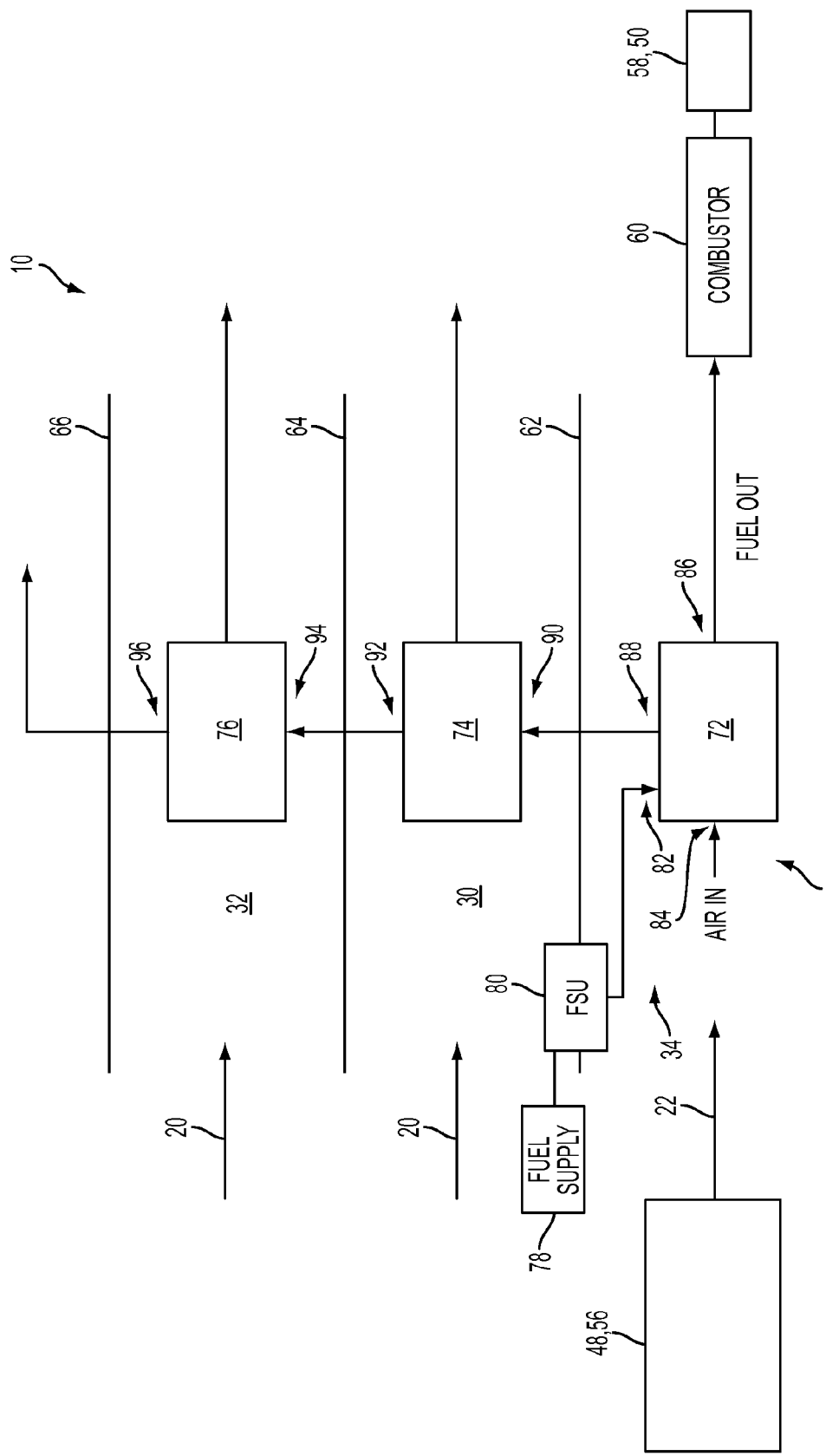
FIG. 3 is a schematic cross-sectional view of a portion of the gas turbine engine shown in FIG. 1 with a cooling air system.

FIG. 3 illustrates a schematic cross-sectional portion of engine 10 having a cooling air system 70 that generally includes a first heat exchanger 72, a second heat exchanger 74, and a third heat exchanger 76. Alternatively, cooling air system 70 may not include second heat exchanger 74. Further, heat exchanger 72, 74, and/or 76 may comprise more than one heat exchanger.

First heat exchanger 72 is a fuel-to-air heat exchanger arranged within core engine case 62 downstream of compressor 56 and upstream of combustor 60. Heat exchanger 72 receives fuel from a fuel supply 78 via a fuel stabilization unit (FSU) 80 and fuel inlet 82. FSU 80 facilitates preventing fuel degeneration by acting as a fuel deoxygenator to reduce oxygen concentration in the fuel, which may reduce undesired coking effects, thereby enabling engine 10 to operate with elevated fuel temperatures.

Heat exchanger 72 also receives core airflow 22 through an air inlet 84 to provide indirect heat exchange between the fuel and core airflow 22. In one embodiment, heat exchanger 72 is a shell and tube heat exchanger. However, heat exchanger 72 may be any suitable type of heat exchanger that enables engine 10 to function as described herein. Liquid fuel passing through heat exchanger 72 receives thermal energy from core airflow 22, and the resulting heated fuel is subsequently directed to combustor 60 via fuel outlet 86. The cooled core airflow 22 exits heat exchanger 72 via air outlet 88 and is directed to an air inlet 90 of heat exchanger 74. Alternatively, heat exchanger 72 may be arranged in either inner bypass 30 or outer bypass 32.

Second heat exchanger 74 is an air-to-air heat exchanger arranged within inner air bypass 30. In one embodiment, heat exchanger 74 is a plate-fin heat exchanger. However, heat exchanger 74 may be any suitable type of heat exchanger that enables engine 10 to function as describe herein. Heat exchanger 74 receives cooled air through air inlet 90, and the cooled air is further cooled by indirect heat exchange with fan airflow 20 flowing through inner bypass 30 and over heat exchanger 74. The cooled air then exits heat exchanger 74 via air outlet 92 and is directed to an air inlet 94 of heat exchanger 76.

Third heat exchanger 76 is an air-to-air heat exchanger arranged within outer air bypass 32. In one embodiment, heat exchanger 76 is a plate-fin heat exchanger. However, heat exchanger 76 may be any suitable type of heat exchanger that enables engine 10 to function as described herein. Heat exchanger 76 receives the cooled air through air inlet 94, and the cooled air is further cooled by indirect heat exchange with fan airflow 20 flowing through outer bypass 32 and over heat exchanger 76. The cooled air then exits heat exchanger 76 via air outlet 96 and is directed to components of the engine or associated vehicle (not shown) to provide cooling thereto. For example, the cooled air may be directed via air outlet 96 to rotatable engine components (e.g., turbine blades, rotors, etc.), static engine components (e.g., vanes, shroud rings, etc.), and/or associated vehicle components (e.g., computer systems, electrical systems, etc.).

A method of assembling engine 10 includes providing fan 46, providing core engine case 62, providing inner fan case 64 about core engine case 62, and providing outer fan case 66 about inner fan case 64. Heat exchanger 72 is arranged in core engine case 62, heat exchanger 74 is arranged in inner air bypass 30, and third heat exchanger 76 is arranged in outer air bypass 32. Heat exchangers 72, 74, and 76 are fluidly coupled such that core airflow 22 is cooled and supplied to heat exchanger 74 where core airflow 22 is further cooled. The cooled core airflow 22 is then supplied to heat exchanger 76 where core airflow 22 is further cooled before being supplied to a component or system for cooling thereof.

Described herein are systems and methods to provide cooling of engine and/or vehicle components. A two-stage air-to-air heat exchanger system is augmented by arranging a fuel-to-air heat exchanger in the core airflow to utilize fuel-air efficiencies before supplying the cooled air to two fan airflow stream heat exchangers. The fuel-to-air heat exchanger utilizes fuel cooling to achieve significant air temperature reduction prior to introduction into the two air-to-air heat exchangers. As such, an air-to-air cooling system is increased in efficiency by utilizing fuel-air heat transfer.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine engine comprising:
   a fan;
   a core engine case configured to receive a core airflow;
   an inner fan case, wherein an inner air bypass is defined between the core engine case and the inner fan case, the inner air bypass configured to receive a first portion of an airflow from the fan;
   an outer fan case, wherein an outer air bypass is defined between the inner fan case and the outer fan case, the outer air bypass configured to receive a second portion of the airflow from the fan;
   a first heat exchanger arranged in the core engine case and configured to receive a liquid and the core airflow, the first heat exchanger providing heat exchange between the liquid and the core airflow to cool the core airflow; and
   a second heat exchanger arranged in the outer air bypass, the second heat exchanger fluidly coupled to the first heat exchanger to receive the cooled core airflow, the second heat exchanger providing heat exchange between the cooled core airflow and the second portion of the airflow to further cool the cooled core airflow.

2. The turbine engine of claim 1, further comprising a third heat exchanger arranged in the inner air bypass and fluidly coupled between the first heat exchanger and the second heat exchanger, the third heat exchanger providing heat exchange between the cooled core airflow and the first portion of the airflow to further cool the cooled core airflow before the core airflow is further cooled in the second heat exchanger.

3. The turbine engine of claim 1, further comprising a fuel stabilization unit fluidly coupled to the first heat exchanger to supply the liquid thereto, wherein the liquid is a fuel.

4. The turbine engine of claim 1, wherein the first heat exchanger is a shell and tube heat exchanger.

5. The turbine engine of claim 1, wherein the second heat exchanger is a plate-fin heat exchanger.

6. The turbine engine of claim 2, wherein the third heat exchanger is a plate-fin heat exchanger.

7. The turbine engine of claim 1, further comprising a compressor arranged in the core engine case upstream of the first heat exchanger.

8. The turbine engine of claim 7, wherein the compressor comprises a low pressure compressor and a high pressure compressor.

9. The turbine engine of claim 7, further comprising a combustor arranged in the core engine case downstream of the combustor.

10. The turbine engine of claim 9, further comprising a turbine arranged in the core engine case downstream of the combustor.

11. The turbine engine of claim 10, wherein the turbine comprises a high pressure turbine and a low pressure turbine.

12. The turbine engine of claim 1, wherein the inner fan case is arranged concentrically about the core engine case, and the outer fan case is arranged concentrically about the inner fan case.

13. A method of assembling a turbine engine, the method comprising:
providing a fan;
providing a core engine case configured to receive a core airflow;
providing an inner fan case about the core engine case, wherein an inner air bypass is defined between the core engine case and the inner fan case, the inner air bypass configured to receive a first portion of an airflow from the fan;
providing an outer fan case about the inner fan case, wherein an outer air bypass is defined between the inner fan case and the outer fan case, the outer air bypass configured to receive a second portion of the airflow from the fan;
arranging a first heat exchanger in the core engine case, the first heat exchanger configured to receive a liquid and the core airflow, the first heat exchanger providing heat exchange between the liquid and the core airflow to cool the core airflow;
arranging a second heat exchanger in the outer air bypass; and
fluidly coupling the second heat exchanger to the first heat exchanger to receive the cooled core airflow, the second heat exchanger providing heat exchange between the cooled core airflow and the second portion of the airflow to further cool the cooled core airflow.

14. The method of claim 13, further comprising:
arranging a third heat exchanger in the inner air bypass; and
fluidly coupling the third heat exchanger between the first and second heat exchangers, the third heat exchanger providing heat exchange between the cooled core airflow and the first portion of the airflow to further cool the cooled core airflow before the core airflow is further cooled in the second heat exchanger.

15. The method of claim 13, further comprising fluidly coupling a fuel stabilization unit to the first heat exchanger to supply the liquid thereto, wherein the liquid is a fuel.

* * * * *